United States Patent [19]

Beiermann et al.

[11] Patent Number: 4,483,199

[45] Date of Patent: Nov. 20, 1984

[54] METHOD OF MEASURING SOLID MATTER MASS FLOW

[75] Inventors: Norbert Beiermann, Brand-Erbisdorf; Manfred Scheller, Freiberg; Horst Kretschmer, Freiberg; Jürgen Noack, Freiberg; Klaus-Dieter Blaschke, Freiberg; Lothar Heinz, Oederan; Peter Göhler; Hans-Joachim Schweigel, both of Freiberg; Hanshans-Heinrich Deicke, Leipzig; Klaus-Peter Rudolph, Leipzig; Johannes Flachowsky, Leipzig, all of German Democratic Rep.

[73] Assignee: Brennstoffinstitut Freiberg, Freiberg, German Democratic Rep.

[21] Appl. No.: 421,115

[22] Filed: Sep. 20, 1982

[30] Foreign Application Priority Data

Sep. 22, 1981 [DD] German Democratic Rep. ... 233471

[51] Int. Cl.$^3$ .......................... G01F 1/70; G01F 1/74
[52] U.S. Cl. ............................... 73/861.04; 73/861.05
[58] Field of Search ........... 73/861.02, 861.03, 861.04, 73/861.05

[56] References Cited

U.S. PATENT DOCUMENTS

| | | | |
|---|---|---|---|
| 2,631,242 | 3/1953 | Metcalf | 73/861.05 |
| 4,055,083 | 10/1977 | Haas | 73/861.04 |
| 4,228,353 | 10/1980 | Johnson | 73/861.04 |
| 4,231,262 | 11/1980 | Boll et al. | 73/861.04 |
| 4,275,601 | 1/1981 | Macko | 73/861.04 |

OTHER PUBLICATIONS

Raptis et al., "Ultrasonic Properties of Coal Slurries and Flow Measurement by Cross Correlation", in IEEE Trans., vol. SU28 #4, Jul. 1981, pp. 248–256.

*Primary Examiner*—Herbert Goldstein
*Attorney, Agent, or Firm*—Michael J. Striker

[57] ABSTRACT

A method of measuring a solid matter mass flow during conveying of solid matter-gas suspensions in tubular conduits, particularly during conveying in a dense stream with high pressure, comprises the steps of changing in a pulse mode a solid matter concentration of a solid matter-gas suspension at one location of the conduit through which the suspension flows, continuously measuring a solid matter concentration of a solid matter-gas suspension or a value corresponding thereto at two measuring locations downstream of the first-mentioned changing location and spaced from one another in the conduit, determining a difference between time points at which a difference of the solid matter concentration or the corresponding value is indicated after one another at the measuring locations downstream of the first-mentioned changing location and spaced from one another, determining a per-unit-time average value of the solid matter concentration of the solid matter-gas suspension in a conduit portion corresponding to the measuring location, generating a signal which is proportional to a quotient from the time per unit average value of the solid matter concentration divided by the difference of the time points at which the change of the solid matter concentration at the measuring locations after one another is indicated, and using this signal as a measure for the solid matter mass flow in the conduit.

17 Claims, 1 Drawing Figure

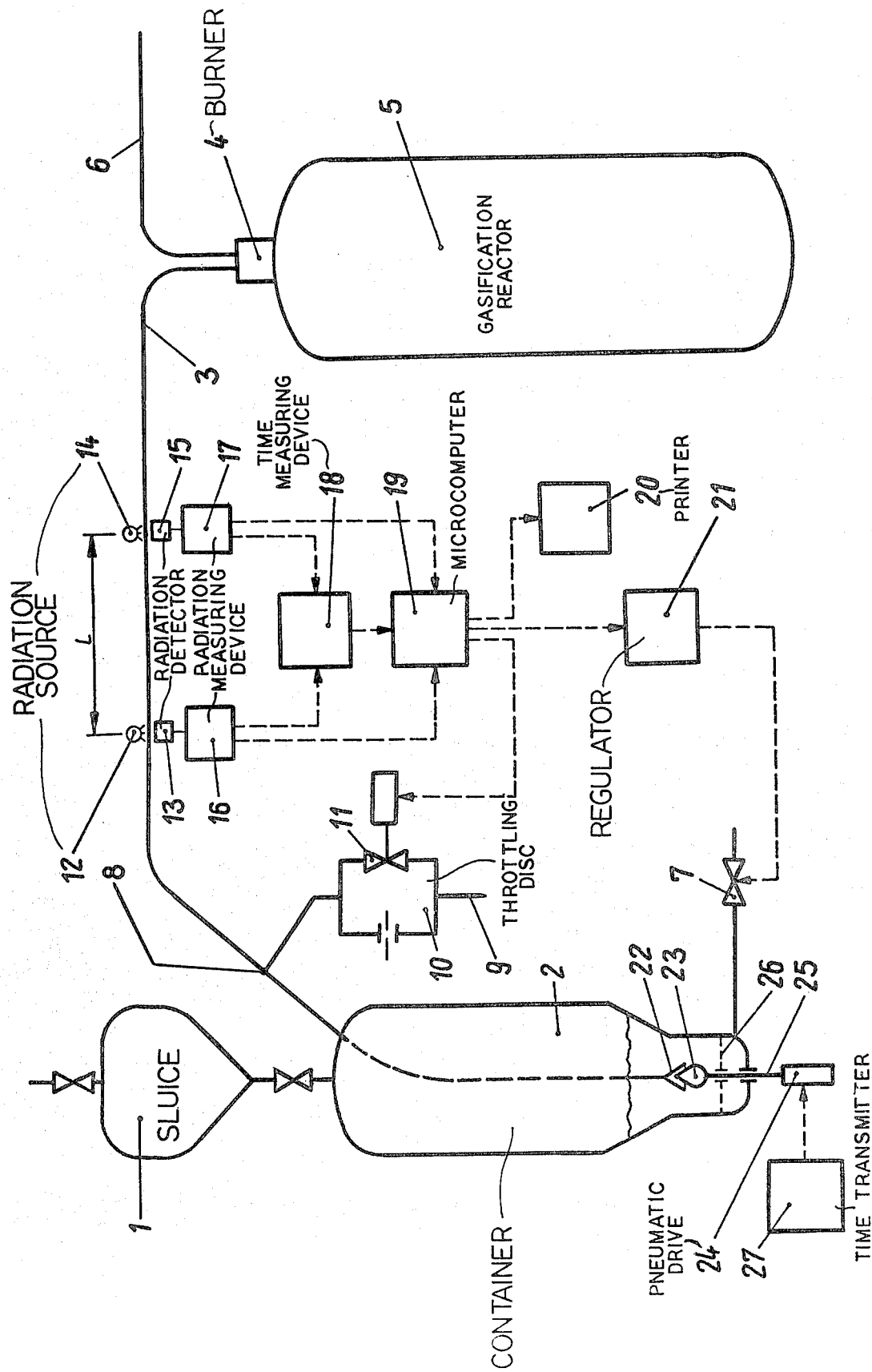

METHOD OF MEASURING SOLID MATTER MASS FLOW

BACKGROUND OF THE INVENTION

The present invention relates to a method of measuring a solid matter mass flow during conveying solid matter-gas suspensions into their conduits, particularly conveying in a dense stream with an increased pressure, such as for example during conveying of dusk-like fuels to gasification reactors operating at high pressure.

In conditions of a wide range of a fuel program, gasification of dust-like fuels with oxygen as gasifying medium in form of a flame reaction has been recognized as particularly advantageous. In many cases this gasification process runs with a high pressure, for example with a pressure of 3 MPa. Technological processes are known, for example as disclosed in the patent DD WP No. 147,188, in which the dust-like fuel is brought via a sluice system to a sufficient pressure and subsequently supplied in suspended condition in a carrier gas stream via supply conduits to one or several burners of the gasification reactor. As disclosed in this paper, it is desirable to retain the dust concentration in the carrier gas stream at an extreme height. Thus, for example, the ratio of the solid matter to the carrier gas-voluminous stream (relative to the working temperature and the working pressure) is adjusted greater than 300 kg/m$^3$.

For the efficiency of the process and the technical safety of the device it is required to measure and regulate the quantity of the dust-like fuel supplied to a burner of the gasification reactor per time unit. If is known from DE-OS No. 2,556,957 to work with several intermittently operating pressure supply containers and to supply the dust-like fuel from these containers via a common supply conduit to the burner of the gasification reactor. In this case the pressure supply container can be supported, for example, on weight-measuring cells and the dust discharge from the supply container, and thereby the dust quantity supplied to the burner, can be determined per time unit. This method fails when several simultaneously or individually monitored supply conduits extend from a pressure supply container to the respective burners, or when a continuous solid matter stream is received from a pressure supply container which is periodically filled via suitable sluices or solid matter pumps.

It is also known to use a measure for the dust quantity stream the pressure drop of the dust-carrier gas suspension at a venturi nozzle installed in the supply conduit, as disclosed in the DE-OS No. 1,433,327, or over a predetermined length of the supply conduit, as disclosed in the publication K. R. Barker et al., "Pressure Feeder for Powdered Coal", Industrial and Engineering Chemistry, 43 (1951) par. 1204–1209. In addition to the fact that the installation of a throttling location such as a venturi nozzle during the supply of dust-carrier gas suspension with high solid matter concentration brings the danger of the operational stoppages because of clogging, the relation between the pressure drop and the dust quantity stream is determined by a plurality of further influencing values, such as geometry of the measuring device, a type of the solid particles to be supplied (grains, grain shape, surface properties, hardness, density), the relation of solid matter quantity to carrier gas volumes and the operational condition of the carrier gas at the measuring location. This method is connected with voluminous calibration work, so that such a measurement is used as a rule only as a tendency measurement.

It is also proposed to measure the carrier gas stream prior to loading with the dust-like fuel and the density of the dust-carrier gas suspension in the supply conduit and to calculate by suitable calculations the dust mass stream, the dust mass supplied per time unit, wherein as additional input values the density of the solid matter particles and the density of the carrier gas are introduced, as disclosed in the DE-OS No. 2,757,032. This method fails, however, when it is used with high solid matter concentrations, in specifically small carrier gas voluminous streams. Even if it is possible to cope with the problems of exactly measuring of small gas voluminous streams at a high pressure or the losses by leakages or by additional small carrier gas quantities supplied, for example, for spraying pressure measuring locations in the conduit, there take place in the sense of the instantaneous value in this conduit considerable differences between the carrier gas voluminous stream at the measuring location prior to the loading with dust and the calibrated carrier gas voluminous stream in the supply conduit. These differences are conditional to the pressure equalization process between the dust supply containers under pressure and the supply conduit which result from the sluice operation for filling of the supply container and from the small pressure variations in the entire system. These differences can be neglected when large carrier gas quantities are introduced for supplying the dust, so-called "thin" stream supply. In condition of a dense stream supply when, for example, a brown coal dust-carrier gas suspension with a concentration of 500 kg of the brown coal dust per m$^3$ of the carrier gas is transported, these differences reach instantaneously the dimension of the entire carrier gas stream, so that the important instantaneous value of the dust mass stream calculated from the carrier gas stream and density of the suspension for the operation and the technical safety of the gasification reactor possesses considerable errors. Finally, the method of the DE-OS No. 2,757,032 cannot be used when several supply streams to be separately regulated and monitored exit from a pressure supply container and the entire carrier gas quantity is supplied as a uniform stream to the supply container.

A method disclosed in DE-OS No. 2,554,565 is also used for a thin stream-supply system, in accordance with which as a guiding value for regulating the dust mass stream a product is drawn from the solid matter density at the measuring location and the difference between a carrier gas voluminous stream and a comparison value is determined. Without further analysis, this method does not provide for a quantitative expression for the dust mass stream. Absorption measurements are used as measuring methods for the solid matter density in the dust-carrier gas suspension, during passage of electromagnetic waves through the suspension and measurements of the electric capacity of the dust-carrier gas suspension between two suitable electrodes is also proposed, as disclosed for example in the DE-OS No. 2,711,114.

Further methods are known for measuring the speed of the solid matter particles in an optical path; with the aid of addition of radioactive tracing substances; and by measuring the pulses of the solid matter stream, or in other words, by measuring the force which is applied by the solid matter stream upon a sensor extending into the stream. It has been shown that the optical measuring method, such as disclosed in the patent DD-WP No. 142,606 is not suitable for solid matter-carrier gas suspensions with very high solid matter concentration and high fineness.

Measuring methods with radioactive tracers are well suited for conducting individual experiments, but encounter some difficulties for continuous operation because of the ray protection and continuous supply and dosing. It is almost impossible to solve these problems if economic aspects are taken into account. Finally, there are measuring devices which operate with pulse methods, such as disclosed, for example, in the Publication Weber, "Aufbereitungstechnik" 7 (1965), p. 603-613. These devices are failure-susceptible in the event of high solid matter concentrations and lead to obstructing of the supply conduit by the sensor insertable into the solid matter stream. The obstructing danger is especially great when the solid matter contains fibrous particles as is the case with several sorts of brown coal dust.

SUMMARY OF THE INVENTION

Accordingly, it is an object of the present invention to provide a method of measuring a solid matter mass stream during conveying solid matter-gas suspension in tubular conduits, which is suitable for solid matter-carrier gas suspensions with a very high solid matter concentration (dense stream conveying) and high pressure, and which can be used effectively in a continuous operation.

It is also an object of the present invention to provide a measuring method particularly for monitoring a supply of a fuel suspended in a carrier gas to burners of pressure gasification reactors or pressure furnaces, which satisfy the high requirements to the acceptability of measurements which take place in these application cases. The signal produced by the measuring method must be utilized as a pulse for regulating the process. It is a further object of the present invention to provide a method of measuring a solid matter mass stream during conveying solid matter-gas suspensions in conduits, particularly at high pressure, which is suitable for suspensions with very high solid matter concentrations or conveying in a dense stream, so that it is not required to introduce into the stream sensors or to provide throttling locations, no open radioactive tracer is needed, the high requirement as to accuracy is satisfied, it is continuously independent of the properties of the solid matter to be supplied and is suitable in the sense of its time condition for pulse generation for the process control and regulation.

In keeping with these objects, and with others which will become apparent hereinafter, one feature of the present invention resides, briefly stated, in a method, in accordance with which at one location of a conduit a solid matter concentration of a solid matter gas suspension flowing through the conduit is changed, at at least two measuring locations located downstream of the changing location at a distance from one another the solid matter concentrations of the solid matter-gas suspension (solid matter gas, relative to the total volume of the suspension) or a value corresponding to the concentration or functionally connected therewith is measured, the difference between the time points is determined to which the changing of the solid matter concentration at the measuring location after one another is indicated. Furthermore, a per unit time average value of the solid matter concentration of the solid matter-gas suspension for a portion in which the measuring locations are located is determined by suitable means, for example logical blocks, a signal is generated which is proportional to a quotient of the per time unit average value of the solid matter concentration, divided by the difference of the time points at which the changing of the solid matter concentration at the measuring locations after one another is indicated, and this signal is used as a measure for the solid matter mass flow in the conduit.

The novel features which are considered characteristic for the invention are set forth in particular in the appended claims. The invention itself, however, both as to its construction and its method of operation, together with additional objects and advantages thereof, will be best understood from the following description of specific embodiments, when read in connection with the accompanying drawing.

BRIEF DESCRIPTION OF THE DRAWING

The single FIGURE of the drawing is a view schematically showing a method in accordance with the present invention.

DESCRIPTION OF THE PREFERRED EMBODIMENT

The present invention resides in a method in accordance with which at one location of a conduit a solid matter concentration of a solid matter gas suspension flowing through the conduit is changed, at at least two measuring locations located downstream of the changing location at a distance from one another the solid matter concentrations of the solid matter-gas suspension (solid matter mass, relative to the total volume of the suspension) or a value corresponding to the concentration or functionally connected therewith is measured, the difference between the time points is determined to which the changing of the solid matter concentration at the measuring location after one another is indicated. Furthermore, a per unit time average value of the solid matter concentration of the solid matter-gas suspension for a portion of said conduit in which the measuring locations are located is determined by suitable means, for example logical blocks, a signal is generated which is proportional to a quotient of the per time unit average value of the solid matter concentration, divided by the difference of the time points at which the changing of the solid matter concentration at the measuring locations after one another is indicated, and this signal is used as a measure for the solid matter mass flow in the conduit.

The proposed solution is based on the observation, unexpectedly found from the semi-technical experiments, that short time pulse like relatively small variations of the solid matter concentration in dense solid matter carrier gas suspension propagate within at least sufficiently narrow tolerances in predetermined conditions described hereinbelow with a speed equal to the speed of movement of the solid matter. This phenomenon is unexpected for an expert, inasmuch as during pneumatic conveyance the forces which act during transport of solid matter particles are exclusively a consequence of a relative movement between the carrier gas and the solid matter particles. The carrier gas flows (at least during conveying in horizontal and upward directions) with a greater speed through the conduit, than the solid matter, as can be seen for example from Weber, "Strömungsfördertechnik", Verlag Mainz, 1974.

Therefore, it can be expected that a deliberately generated short time changing of the solid matter concentration in a solid matter-carrier gas suspension, or a changing of the ratio of the solid matter volume to the carrier gas volume, propagates in the conduit with a speed which does not correspond either to the carrier gas speed or to a speed between the carrier gas speed and solid matter speed. This is known from fluidized bed technique that bubbles or spaces with considerably reduced solid matter concentration move relative to the solid matter fluidized layer.

In contrast to these expectations it has been found, as mentioned hereinabove, that the short time pulse-like changes of the solid matter concentration of a solid matter-carrier gas suspension in a tubular conduit in predetermined condition propagate with a transport speed equal to the speed of the solid matter, and thereby the transport speed $v_s$ of the solid matter in the conduit can be determined directly by measuring the propagation speed of short time changes of the solid matter concentration. As mentioned above, the propagation speed of the pulse-like generated changes of the solid matter concentration is measured so that the difference between the time points is determined at which the changes of the solid matter concentration after one another at at least two solid matter concentration measuring locations arranged at a distance L is indicated. Thereby $$v_s = (L/\Delta t)$$

wherein $\Delta t$ is the above mentioned time difference.

The solid matter mass stream $F_s$ through the conduit can be determined by multiplication of $v_s$ with the conduit cross section A and a solid matter concentration $C_s$ drawn from the volume of the carrier gas plus solid matter (in mass units relative to volume units). Since because of the pulse-like changes of the solid matter concentration it is not constant, in accordance with the invention not the solid matter mass flow $C_s$ is used, but instead a per time unit average value of the solid matter concentration $\overline{C}_s$ is used which can be determined by known means from a continuous measuring of the concentration. The solid matter mass stream is thereby $$F_s = L \cdot A \cdot (\overline{C}_s / \Delta T)$$

A signal corresponding to this solid matter mass stream is produced with a known means by a combination of $\overline{C}_s$ and $\Delta t$ corresponding to this equation.

In accordance with the present invention, the time period for the pulse-like change of the solid matter concentration is less than 1 second, advantageously 0.1–0.5 second. Thereby the solid matter concentration lowered by 10–40% as compared with its normal value. Within this region the degree of lowering the solid matter concentration is determined by a type and susceptibility of the used measuring processes for the solid matter concentration and its natural variation range.

In accordance with an advantageous feature of the invention, the pulse-like change of the solid matter concentration is performed by a pulse-like injection of an additional gas quantity in the conduit. Depending upon the geometrical requirements to the injection location given by the outer conditions and upon the properties of the supplied material, there could be a danger that the injection opening in the tubular conduit is obstructed after a certain time. In accordance with the present invention this danger is avoided by supplying at the injection location continuously a relatively small gas stream which increased in a pulse mode to a maximum value and then reduced to the initial value.

The above mentioned degree of lowering of the solid matter concentration, required for measuring, is obtained by respective dosing of the injected gas stream.

The pulse-like change of the solid matter concentration can be obtained in accordance with a further embodiment of the invention, instead of injecting an additional gas quantity, by a short time throttling of the solid matter stream. Such a throttling can advantageously be performed by a short time change in the inlet cross section at a solid matter inlet in the conduit, advantageously by short time adjustment of an adjusting and closing body located prior to the solid matter inlet in the conduit, as disclosed for example in a patent application No. DD WP G 05 B/227 094/7.

It has been recognized from comparative experiments with radioactive tracers that the short time throttling does not lead to an impact-type conveyance, but downstream of the throttling location a uniform solid matter gas speed is retained, and the solid matter concentration is lowered for a time period approximately corresponding to the period of this throttling.

For providing a quasi-continuous measurement of the solid matter mass stream, the pulse-like changes of the solid matter concentration be performed periodically in accordance with the present invention. In an advantageous embodiment, the impulse distance is equal to 4–30 seconds. In accordance with the present invention, it is also possible that the pulse-like change of the solid matter concentration is released to the throughflow time points of the preceding pulse-like change at the measuring locations for the solid matter concentration. A pulse-like change of the solid matter concentration is caused after the passage of the preceding pulses is indicated at the second measuring location as considered in the flow direction.

In accordance with an advantageous feature of the invention, a radiometric transmission measuring process or determination of the intensity weakening of a beam coming from a source through a supply stream is used for measuring the solid matter concentration or a value functionally connected therewith at the measuring locations. A type and strength of the radiation source and the geometry of the radiation receiver are determined upon the conduit, its cross section, its wall thickness, as well as the type and concentration of the solid matter, so that the required integration time for the radiometric transmission measurement is small, as compared with the difference of the indication time points for the change in the solid matter concentration at the measuring locations.

In correspondence with the invention, for forming the above mentioned time per unit average value of the solid matter concentration $\overline{C}_s$ with suitable known means the result of the radiometric transmission measurements is drawn at one of the above mentioned measuring locations. In the event of increased requirements to the accuracy and relatively great distance L between the measuring locations it can be advantageous when for the formation of time per unit average value an arithmetic average of the simultaneous measurements at the measuring locations is determined and this average value is used as a base for the time per unit average value formation.

With use of radiometric transmission measuring processes it is especially advantageous in accordance with the present invention when the solid matter concentration is lowered in pulse-like manner so that the counted rate for the ray throughflow (receiver radiation impulse per time unit) is increased at the measuring locations by 3-10%, advantageously by 4-6% relative to the initial value. At least in the event of solid matter conveying in dense stream the relative magnitude of the lowering the solid matter concentration lies within the above mentioned regions between 10 and 40%.

Another advantageous feature of the present invention is that the dielectric constant of the solid matter-gas suspension is used as a value functionally connected with the solid matter concentration, and a capacity measuring process is used for measurements at the above mentioned measuring locations. Such a measuring method has an advantage as compared with the radiometric transmission measurement in its short dead time periods. The measuring result is relatively strongly influenced in the event of many conveying materials by variations in the properties of the conveying material. This is not disturbing for the determination of the transport speed of the solid matter, so that all advantages of the short dead time period are fully valuable. However, the accuracy of the solid matter concentration can be so influenced that an additional radiometric transmission measurements for the determination of the solid matter concentration is required, which is performed in the advantageous manner in the center between the above mentioned capacity measuring locations.

For determination of the difference between the time points at which the change of the solid matter concentration or the value functionally connected therewith is indicated at the measuring locations, known analog and digital evaluating methods are available.

In the order of increasing accuracy but also increasing costs, the following possibilities for determination passage points of pulse-like change of the solid matter concentration at a measuring location have been successful.

Time point of passing a fixed level-barrier outside the natural variation region of the solid matter concentration.

Arithmetical average between the time points of exceeding and, after having reached an extremum, falling below a fixed level barrier.

Introduction of a variable level barrier which is supplied in a fixedly predetermined distance to a continuously counted average value of the solid matter concentration of the directly preceding time space.

Time point of the apex value of the solid matter concentration-time function at the respective measuring location.

For holding the pulse-like change of the solid matter concentration as low as possible and nevertheless being able to provide reliable indication, a further feature of the present invention is that an automatic correlation process is used for determination of the time difference for the indication of the pulse-like solid matter concentration change at the measuring locations. Known cross-correlations or polarization correlations can be used. With utilization of the correlation technique it is advantageous, as a rule, to control the release of the solid matter concentration changes by the correlator automatically and to provide several passages of solid matter correlation pulses in the time period for a correlation computation of for example 10 seconds.

The FIGURE illustrates schematically a method in accordance with the present invention for measuring the solid matter mass flow in the event of supply of a dust-like fuel to a gasification reactor. Two examples of the method of the invention are given hereinbelow.

A dust mass flow to a device for gasification of a dust-like fuel is measured and regulated in accordance with the inventive method. The dust-like fuel is applied via a sluice 1 to a dosing container 2 which is under a pressure of approximately 3 MPa. In a lower part of the dosing container 2, the dust is fluidized by blowing in a carrier gas and flows as a dense dust-carrier gas suspension via supply conduit 3 to a burner 4 of a gasification reactor 5. The dust-like fuel is supplied in the reactor with an oxygen-rich gasification mixture via a gasification medium conduit 6 under pressure of approximately 2.8 MPa. The solid matter mass flow supplied to the reactor is regulated via a carrier gas stream supplied via the dosing container through a regulating valve 7. The solid matter concentration of the solid matter-gas suspension flowing through the supply conduit 3 lies in a region of 300–500 kg of solid matter per $m^3$ of the suspension volume (sum of gas and solid matter volume). A small additional carrier gas stream is continuously injected at an injection location 8 via conduit 9 and a throttling disk 10 and not considerably influences the solid matter concentration of the suspension. By short time opening of a magnetic valve 11 the additional carrier gas stream injected at the location 8 is increased in a pulse-like manner so that the solid matter concentration of the suspension flowing during this injection at the location 8 of the conduit is distinctly decreased.

Downstream of the injection location 8, two measuring locations for determination of the solid matter concentration in the suspension are arranged at a distance from one another of L=6 m. The distance between the injection location 8 (concentration changing location) and the first measuring location exceeds 2 m and can be equal to substantially 5 m. The measuring locations work in accordance with the principle of the $\gamma$-radiation transmission measurement and each includes a $\gamma$-radiation source 12 and 14 and a radiation detector 13 and 15. The detectors are connected with radiation measuring devices 16 and 17 which produce both an analog signal (radiation pulse density or countergrade) and a digital signal in regular time periods.

The lowering of the solid matter concentration obtained in a pulse mode at the injection location 8 propagates with the transport of the suspension in the supply conduit 3 and is first indicated at the measuring location including the radiation source 12 and the detector 13. This is expressed in such a manner that the counted rate obtained from the radiation measuring device 16 increases in a pulse-like manner and again falls to the nominal value or the normal variation region of the counted rate. The radiation measuring device 16 produces an analog signal proportional to the counted rate which during exceeding of a predetermined level barrier above the normal variation region starts a time-measuring device 18. Correspondingly, the time measurement is stopped when over the detector 15 and the radiation measuring device 17 the passage of the solid matter concentration disturbance is indicated and the time measuring device 18 is supplied.

The digital signals given by the radiation measuring devices 16 and 17 in regular time periods, for example 0.5 sec., the number of the radiation pulses which take place during this time period, are supplied to microcomputer 19 which averages the simultaneously incoming signals of both measuring locations and subsequently combines the spatial average values determined in a directly preceding time period of for example 10 seconds to a per time unit average value. With consideration of calibration functions depending on the geometrical arrangement of the radiation source and detector and type of radiator, the counted rate $Z_o$ in an empty tube and the mass weakening coefficient of the dust which is separately determined particularly in dependence upon the composition and ash portion of the dust-like fuel, and under elimination of the influence of the carrier gas density of the result of the transmission measurements, an average solid matter concentration $\overline{C}_s$ is determined by the computer 19. In accordance with the equation $$F_s = L \cdot A \cdot \overline{C}_s / \Delta t$$

This value is combined with the time $\Delta t$ received from the time counter 18 to the solid matter mass flow $F_s$ in kg/s. A is a cross section of the conduit 3 and L is the distance between both measuring locations.

The above mentioned elimination of the portion of the carrier gas density is required in the event of high operational pressure, as in the present example, inasmuch as the radiometric transmission measurement is primarily to give the density of the suspension $\rho_i$ or the ratio of the mass of the solid matter plus carrier gas to the entire volume of the suspension. With the pure density of the solid matter $\rho_s$ additionally introduced in the computer and determined offline, and the density of the carrier gas under normal conditions $(\rho_G)_N$ solving equation takes place $$C_s = \frac{\rho_i P_N T_G - (\rho_G)_V P_G T_n}{\rho_s P_N T_G - (\rho_G)_N P_G T_N} \rho_s$$

wherein the condition values of the gases $P_g$ and $T_G$ are selectively introduced into the computer or (as not shown in FIG. 1) can be transmitted by special measuring value transmitters on the supply conduit. The reference condition values $P_n$ and $T_n$ are fixedly introduced.

The thus calculated mass stream $F_s$ is used with the aid of a regulator 21 acting upon the regulating valve 7 in the carrier gas supply for controlling the stream of the dust-like fuel flowing to the reactor 5. Moreover, the mass flow is recorded by a printer 20.

After completion of a measuring and counting cycle a new gas injection is released by the computer 19 via the magnetic valve 11. With the supply conduit 3 having a diameter of 50 mm 15 t/h of brown coal dust is conveyed. The carrier gas quantity amounts prior to the injection location 6 in the respective operational condition (3.0 MPa, 28° C.) to 27.5 m³/h corresponding to 770 m³/h in normal condition. Via the throttling disk 10 a gas stream of 0.25 m³/h corresponding to 7 m³/h in normal condition is supplied continuously for spraying the injection device. By opening of the magnetic valve 11, additionally 7.3 m³/h (200 m³/h in normal condition) is injected in the supply conduit in pulse-like manner over a time period of 0.6 seconds. By this injection the solid matter concentration $C_s$ of the coal dust-carrier gas suspension is lowered from 400 kg/m³ to 328 kg/m³ of the suspension volume. Approximately in 1 second after the beginning of the injection, the counted rate obtained from the radiation device 16 increases by 6%. After a further time period of $\Delta t = 1.13$ seconds an identical increase of the counted rate is indicated at the radiation measuring device 17.

For computation of the solid matter mass stream the average value of the solid matter concentration of both measuring locations is drawn over 8 seconds. The solid matter mass stream is evaluated total in 10 seconds.

Control experiments with weighing of the received dust obtain measuring tolerances for the dust mass stream of ±5%. Comparative measurements for determination of solid matter speed or solid matter running time with individual radioactively marked particles as tracers in solid matter stream provide the determination relative to the speed with the result of the above presented example in a tolerance of less than ±2%. The higher failure of the mass flow measurements results from failure during the determination of the solid matter concentration $C_s$.

EXAMPLE 2

With the same arrangement as described in Example 1, an adjusting and closing body 23 is arranged prior to a conical inlet 22 of the supply conduit 3 inserted in the dosing container 2. The closing body is axially displaceable by a pneumatic drive 24. A rotor 25 extends in a pressure-tight manner through a bottom of the dosing container and a flow body 26 located in a lower part of the latter. As not shown in the drawing, a partial stream of the carrier gas is branched after the regulating valve 7 and supplies to the adjusting and closing body. This partial stream enters at the tip of the adjusting body the supply pipe.

With the aid of the pneumatic drive, the adjusting body is displaced in a pulse-like mode in direction of the inlet so that the free annular cross section between the conical inlet 22 and the conical upper part of the adjusting body is reduced to approximately 50% of the normal position. Thereby the solid matter concentration of the flow entering the supply conduit is reduced by approximately 25%. The measuring and evaluating process corresponds to Example 1. The increase of the counted rate during passage of the suspension reducing solid matter concentration amounts to approximately 8%.

In comparison with Example 1, the device for injecting additional gas or the position 8–11 are dispensed with. Contrary to Example 1, the short time pulse-like throttling of the solid matter introduction is periodically released by a separate time transmitter 27, and these periods are longer than the time required for measuring and evaluation of a measuring cycle.

It will be understood that each of the elements described above, or two or more together, may also find a useful application in other types of constructions differing from the types described above.

While the invention has been illustrated and described as embodied in an arrangement for measuring a solid matter mass flow, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A method of measuring a solid matter mass flow during conveying of solid matter-gas suspension in conduits, particularly during conveying in a dense stream at high pressure, comprising the steps of
   changing in a pulse mode a solid matter concentration of a solid matter-gas suspension at one location of a conduit through which the suspension flows;
   continuously measuring a solid matter concentration of the solid matter gas suspension or a value corresponding thereto at two measuring locations downstream of the first mentioned changing location and spaced from one another in the conduit;
   determining a difference in time at which a difference of the solid matter concentration or the corresponding value is indicated after one another at the measuring locations downstream of the changing location and spaced from one another;
   determining a per unit time average value of the solid matter concentration of the solid matter-gas suspension in the conduit portion corrresponding to the measuring locations;
   producing a signal which is proportional to a quotient from the time per unit average value of the solid matter concentration divided by the difference in time at which the change of the solid matter concentration at the measuring locations after one another is indicated; and
   using this signal as a measure for the solid matter mass stream in the conduit.

2. A method of measuring a solid matter mass flow as defined in claim 1, wherein said changing step includes changing with a pulse having a duration of less than 1 second, and lowering the solid matter concentration during the duration maximum by 10-40% of its nominal value, said measuring step including arranging a first one of the measuring locations so that a conduit length between the first mentioned changing location and the first measuring location exceeds 2 meters.

3. A method of measuring a solid matter mass flow as defined in claim 2, wherein the duration of the pulse of changing the solid matter concentration is equal to substantially 0.1 and 0.5 seconds.

4. A method of measuring a solid matter mass flow as defined in claim 2, wherein the conduit length between the first mentioned changing location and the first measuring location in the conduit is equal to substantially 5 meters.

5. A method of measuring a solid matter mass flow as defined in claim 1, wherein said changing step includes changing in a pulse mode the solid matter concentration by injecting in a pulse mode an additional gas quantity.

6. A method of measuring a solid matter mass flow as defined in claim 5, wherein said injecting step includes continuously supplying a relatively small gas stream, and increasing the latter to a maximum value in a pulse mode with subsequent decreasing to an initial value.

7. A method of measuring a solid matter mass flow as defined in claim 1, wherein said changing step includes short time throttling the solid matter stream in a pulse mode in the conduit.

8. A method of measuring a solid matter mass flow as defined in claim 7, wherein said throttling step includes short time changing an inlet cross section of a solid matter inlet in the conduit.

9. A method of measuring a solid matter mass flow as defined in claim 8, wherein said short time inlet cross section changing step includes short time adjusting an adjusting and closing body arranged prior to the solid matter inlet of the conduit.

10. A method of measuring a solid matter mass flow as defined in claim 1, wherein said changing step includes periodically changing the solid matter concentration in a pulse mode.

11. A method of measuring a solid mattermass flow as defined in claim 1, wherein said changing step includes releasing the changing after passage of the preceding changing at a second measuring location, as considered in a flow direction, is indicated.

12. A method of measuring a solid matter mass flow as defined in claim 1, wherein said measuring step for measuring the connected value includes using a radiometric transmission measuring at the measuring locations, a type and strength of a radiation source and a geometry of a radiation receiver being determined upon the conduit, its cross section, and a type and concentration of the solid matter, so that a required integration time of the transmission measuring is small, as compared with the distance between the indication time points for changing the solid matter concentration at the measuring location.

13. A method of measuring a solid matter mass flow as defined in claim 12, wherein said changing step includes reducing the solid matter concentration so that a counted rate gained during the radiometric transmission measuring are increased by 3-10% relative to the normal values.

14. A method of measuring a solid matter mass flow as defined in claim 13, wherein said reducing step includes increasing the counted rate by 4-6% relative to the normal values.

15. A method of measuring a solid matter mass flow as defined in claim 13, and further comprising the step of forming a per unit time value of the solid matter concentration by bringing the result of the radiometric transmission measuring at one of the measuring locations or an arithmetic average of simultaneous measuring at two measuring locations.

16. A method of measuring a solid matter mass flow as defined in claim 1, wherein the corresponding value is a dielectric constant of the solid matter-gas suspension, said measuring step including using capacitive measuring devices at the measuring location.

17. A method of measuring a solid matter mass flow as defined in claim 1, wherein said time points difference determining step includes determining a difference between time points in accordance with a correlation technique.

* * * * *